US011969917B2

(12) United States Patent
Kim et al.

(10) Patent No.: US 11,969,917 B2
(45) Date of Patent: Apr. 30, 2024

(54) MANUFACTURING METHOD OF SILICON CARBIDE WAFER, SILICON CARBIDE WAFER AND SYSTEM FOR MANUFACTURING WAFER

(71) Applicant: SENIC Inc., Cheonan-si (KR)

(72) Inventors: Jung-Gyu Kim, Cheonan-si (KR); Kap-Ryeol Ku, Cheonan-si (KR); Jung Doo Seo, Cheonan-si (KR); Jung Woo Choi, Cheonan-si (KR); Jong Hwi Park, Cheonan-si (KR)

(73) Assignee: SENIC Inc., Cheonan-si (KR)

( * ) Notice: Subject to any disclaimer, the term of this patent is extended or adjusted under 35 U.S.C. 154(b) by 191 days.

(21) Appl. No.: 17/575,999

(22) Filed: Jan. 14, 2022

(65) Prior Publication Data

US 2022/0219354 A1 Jul. 14, 2022

(30) Foreign Application Priority Data

Jan. 14, 2021 (KR) ........................ 10-2021-0005463

(51) Int. Cl.
*B32B 3/00* (2006.01)
*B28D 5/00* (2006.01)
*B28D 5/04* (2006.01)

(52) U.S. Cl.
CPC ........... *B28D 5/045* (2013.01); *B28D 5/0064* (2013.01); *B28D 5/0082* (2013.01)

(58) Field of Classification Search
CPC ...................................................... B28D 5/045
See application file for complete search history.

(56) References Cited

U.S. PATENT DOCUMENTS

2014/0117380 A1* 5/2014 Loboda .................. C30B 33/00 438/692
2018/0237942 A1 8/2018 Wada et al.
(Continued)

FOREIGN PATENT DOCUMENTS

CN 102543718 A 7/2012
EP 2 514 857 A1 10/2012
(Continued)

OTHER PUBLICATIONS

Extended European search report issued on May 25, 2022, in counterpart European Patent Application No. 22151229.6 (128 pages).

(Continued)

*Primary Examiner* — Elizabeth E Mulvaney
(74) *Attorney, Agent, or Firm* — NSIP Law

(57) ABSTRACT

A silicon carbide wafer manufacturing method includes: a bending measuring step of measuring a first edge having the greatest degree of a bending at one surface of a silicon carbide ingot having one surface; a cutting start step of starting a cutting at a second edge having a distance of r×a along an edge of the one surface from the first edge in a direction parallel to or with a predetermined off angle with respect to the one surface through the wire saw, a cutting speed being decreased to a first cutting speed in the cutting start step; a cutting proceeding step in which the first cutting speed is substantially constant within a variation of about ±5% of the first cutting speed; and a finish step in which the cutting speed is increased from the first cutting speed and the cutting of the silicon carbide ingot is completed.

7 Claims, 5 Drawing Sheets

(56) References Cited

U.S. PATENT DOCUMENTS

| | | | | |
|---|---|---|---|---|
| 2019/0194823 | A1 | 6/2019 | Fujikawa | |
| 2019/0252180 | A1* | 8/2019 | Tanaka | B24B 7/04 |

FOREIGN PATENT DOCUMENTS

| | | | |
|---|---|---|---|
| JP | 2001-334452 | A | 12/2001 |
| JP | 2013-38116 | A | 2/2013 |
| JP | 2013-89937 | A | 5/2013 |
| JP | 2015-12124 | A | 1/2015 |
| JP | 2019-127415 | A | 8/2019 |
| KR | 10-2009-0070483 | A | 7/2009 |
| KR | 10-2015-0074176 | | 7/2015 |
| KR | 10-1613794 | | 4/2016 |
| KR | 10-2016-0058867 | | 5/2016 |
| KR | 10-2103712 | | 4/2020 |
| TW | 201829117 | A | 8/2018 |
| WO | WO 2017/134925 | A1 | 8/2017 |

OTHER PUBLICATIONS

Taiwanese Office Action issued on Oct. 4, 2022, in counterpart Taiwanese Patent Application No. 111101336 (4 pages in Chinese).

Japanese Office Action issued on Jan. 4, 2023, in counterpart Japanese Patent Application No. 2022-003382 (2 pages in Japanese).

Chinese Office Action issued on Sep. 29, 2023, in counterpart Chinese Patent Application No. 202210038941.9 (6 pages in Chinese).

* cited by examiner

C.Example 1

MANUFACTURING METHOD OF SILICON CARBIDE WAFER, SILICON CARBIDE WAFER AND SYSTEM FOR MANUFACTURING WAFER

CROSS-REFERENCE TO RELATED APPLICATIONS

This application claims the benefit under 35 USC 119(a) of Korean Patent Application No. 10-2021-0005463 filed on Jan. 14, 2021 in the Korean Intellectual Property Office, the entire disclosures of which are incorporated herein by reference for all purposes.

BACKGROUND

Technical Field

The disclosure relates to a manufacturing method of a silicon carbide wafer, a silicon carbide wafer and a system for manufacturing a wafer.

Discussion of Art

Silicon carbide (SiC) has excellent heat resistance and mechanical strength and is physically and chemically stable, so that it is beneficial as a semiconductor material. Recently, as a substrate for high power devices, the demand of silicon carbide single crystal substrates is increasing.

As a method for preparing a silicon carbide single crystal, there are Liquid Phase Epitaxy (LPE), Chemical Vapor Deposition (CVD), Physical Vapor Transport (PVT), and similar methods. Among them, the PVT is a method of growing a silicon carbide single crystal: by loading a silicon carbide raw material into a crucible, disposing a seed crystal composed of a silicon carbide single crystal on the top of the crucible and then heating the crucible by an induction heating method to sublimate the raw material to grow the silicon carbide single crystal on the seed crystal.

PVT is the most widely used because it can produce silicon carbide in the form of an ingot of excellent quality with a high growth rate. However, bending and twist of the produced silicon carbide ingot may occur and if such bending or twist occurs, there is a possibility that the flatness of the wafer may be uneven in the cutting process using a wire saw or the like.

Therefor, in order to secure the flatness of the silicon wafer and improve the performance and the yield of a semiconductor device manufactured therefrom, it is necessary to consider an improved method of cutting the silicon carbide ingot.

The information disclosed in this Discussion of Art section is only for enhancement of understanding of the background of the invention, and therefore it may contain information that does not form the related art that is already known to a person of ordinary skill in the art.

There are related prior technologies of "Cutting method of high hardness material by multi-wire saw" disclosed in Korean Patent Publication No. 10-2015-0052037, "Ingot cutting device" disclosed in Korean Patent Publication No. 10-2014-0155310 or the like.

BRIEF DESCRIPTION

An object of an embodiment is to provide a method for manufacturing silicon carbide wafer capable of exhibiting good flatness in consideration of the degree of the bending of the edge region, the cutting speed and an amount of wire supply while the silicon carbide ingot is cut.

Another object of an embodiment is to provide a silicon wafer exhibiting a good flatness.

Another object of an embodiment is to provide a system capable of manufacturing a wafer capable of exhibiting good flatness in consideration of the degree of the bending of the edge region, the cutting speed and an amount of wire supply while the silicon carbide ingot is cut.

A silicon carbide wafer manufacturing method according to an embodiment of the present invention includes: a bending measuring step of measuring a first edge having the greatest degree of a bending at one surface of a silicon carbide ingot having one surface, the other surface and a lateral surface connecting the one surface and the other surface; a cutting start step of starting a cutting at a second edge 22 having a distance of r×a along an edge of the one surface from the first edge 21 in a direction parallel to or with a predetermined off angle with respect to the one surface through the wire saw 15, a cutting speed being decreased to a first cutting speed in the cutting start step; a cutting proceeding step in which the first cutting speed is substantially constant within a variation of ±5%; and a finish step in which the first cutting speed is increased and the cutting of the silicon carbide ingot is completed. A supply amount (m/min) of the wire saw reaches a first supply amount in the cutting start step and subsequently is substantially constant within a variation of ±5% before the finish step. r is a radius of the one surface, and a may be i) 1.4 rad to 1.75 rad or ii) 2.96 rad to 3.32 rad.

In an embodiment, the silicon carbide ingot may include 4H silicon carbide grown by a sublimation and a recrystallization.

In an embodiment, the cutting in the cutting start step may proceed in a direction toward an edge farthest from the second edge of the one surface.

In an embodiment, the first cutting speed may be 3 mm/hr to 10 mm/hr.

In an embodiment, the first supply amount is 0.5 m/min to 4 m/min.

In an embodiment, the wire saw may include multi-wire saws that are provided in a plurality along a direction from the one surface and to the other surface of the silicon carbide ingot with a predetermined interval.

A silicon carbide wafer according to an embodiment of the present invention includes one surface and the other surface, wherein a standard deviation of a flatness of a central region occupying 95% of a radius from a center of the one surface in an outward direction is 5 μm to 10 μm.

In an embodiment, an average flatness of the one surface of the silicon carbide wafer may be 250 μm or less.

In an embodiment, the silicon carbide wafer may include silicon carbide of 4H structure, and wherein the one surface is a Si surface on which a silicon atom layer is exposed.

A system for manufacturing a silicon carbide wafer according to an embodiment includes: a bending measuring unit measuring a first edge having a greatest degree of being in on surface of a silicon carbide ingot comprising the one surface, the other surface and a lateral surface connecting the one surface and the other surface; a control unit designating a second edge having a distance of r×a along an edge of the one surface of the first edge of the one surface of the silicon carbide ingot measured by the bending measuring unit; and a cutting unit cutting the silicon carbide ingot in a direction parallel to or with a predetermined off angle with respect to the one surface through a wire saw. The control unit controls a movement of the silicon carbide ingot toward the cutting unit and a supply amount of the wire saw. The cutting unit fabricates the silicon carbide wafer by performing: a cutting start step in which a cutting speed of the cutting unit is decreased to a first cutting speed; a cutting proceeding step in which the first cutting speed is substantially constant within a variation of ±5%; and the cutting finish step in which the first cutting speed is increased and a cutting of the silicon carbide ingot is completed. A supply amount (m/min) of the wire saw of the cutting unit approaches a first supply amount in the cutting start step and is substantially constant within a variation around ±5%. r is a radius of the one surface, and a is i) 1.4 rad to 1.75 rad or ii) 2.96 rad to 3.32 rad.

In a manufacturing method of a silicon carbide wafer according to an embodiment, an edge having a greatest bending value in one surface of the silicon carbide ingot and an edge apart therefrom by a predetermined distance and a silicon carbide ingot is cut under conditions of a specific cutting speed and a supply amount of a wire saw, and thereby a silicon carbide wafer having improved characteristics of a flatness can be obtained.

A wafter manufactured by a manufacturing method of a silicon carbide wafer according to an embodiment has good characteristics of a flatness, and accordingly an improvement of electrical characteristics of a device manufactured therefrom and also an improvement of a manufacturing yield can be expected.

A wafer manufacturing system of a silicon carbide wafer determines an edge having a greatest bending value in one surface of the silicon carbide ingot and an edge apart therefrom by a predetermined distance and a silicon carbide ingot is cut under conditions of a specific cutting speed and a supply amount of a wire saw, and thereby a silicon carbide wafer having improved characteristics of a flatness can be obtained.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
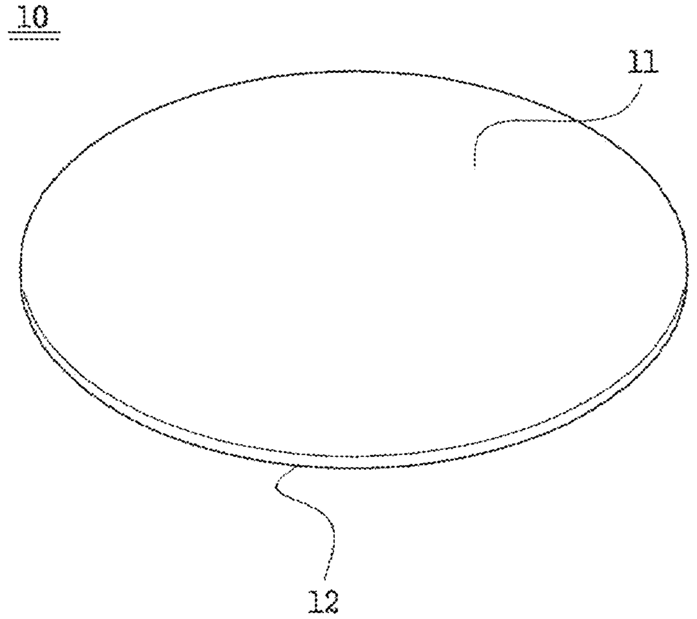
FIG. 1 is a conceptual view for showing one example of a silicon carbide wafer according to one embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

In this application, the phrase "combination(s) thereof" included in a Markush-type expression denotes one or more mixtures or combinations selected from the group consisting of components stated in the Markush-type expression, that is, denotes that one or more components selected from the group consisting of the components are included.

In this application, a size and an angle illustrated in drawings are arbitrarily shown for easy description, and are not necessarily analyzed by being limited to the illustration.

Manufacturing Method of Silicon Carbide Wafer

In order to achieve the above object, the method of manufacturing a silicon carbide wafer according to an embodiment includes: a bending measuring step of measuring a first edge 21 having the greatest degree of a bending at one surface of a silicon carbide ingot 100 having one surface 120, the other surface 110 and a lateral surface connecting the one surface and the other surface; a cutting start step of starting a cutting at a second edge 22 having a distance of r×a along an edge of the one surface from the first edge 21 in a direction parallel to or with a predetermined off angle with respect to the one surface through the wire saw 15, a cutting speed being decreased to a first cutting speed in the cutting start step; a cutting proceeding step in which the first cutting speed is substantially constant within a variation of ±5%; and a finish step in which the first cutting speed is increased and the cutting of the silicon carbide ingot is completed. A supply amount (m/min) of the wire saw reaches a first supply amount in the cutting start step and is substantially constant within a variation of ±5% before the cutting finish step. r is a radius of the one surface and a may be i) 1.4 rad to 1.75 rad or ii) 2.96 rad to 3.32 rad.

In the method of manufacturing the silicon carbide wafer according to an embodiment, the bending measuring step is a step in which a silicon carbide ingot 100 having one surface 120, the other surface 110 and a lateral surface connecting the one surface and the other surface is prepared and the first edge 21 having the greatest bending at the one surface of the silicon carbide ingot is measured.

In the bending measuring step, a process of measuring the bending of the one surface 120 of the silicon carbide ingot 100 can be accomplished by measuring a highest height of the first edge 21 with respect to a center point of the one surface 120 by a Height Gauge (Mitutoyo's ID-H0560 Model).

Figure 2:
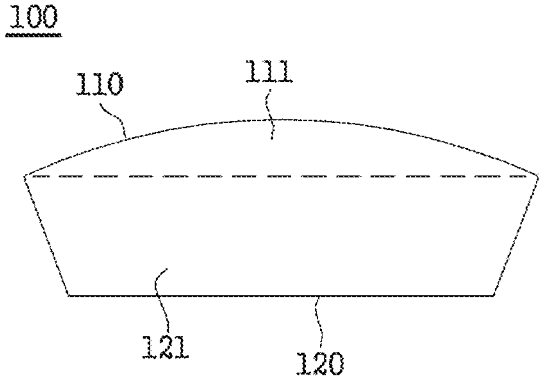
FIG. 2 is a conceptual view for showing one example of a silicon carbide ingot used in a method for manufacturing a silicon carbide wafer according to one embodiment.

The silicon carbide ingot 100 in the bending measuring step may be a silicon carbide ingot that is grown through sublimation and recrystallization of the raw material onto a seed crystal within a container in which the raw material and the seed crystal are spaced apart. As shown in FIG. 2, the silicon carbide ingot may include a main body portion 121 and a distal end portion 111 in the main body, and a surface of the distal end portion 111 may have a curved shape.

In the bending measuring step the one surface 120 of the silicon carbide ingot 100 may be a surface that is cut from the seed crystal after being formed through the sublimation and the recrystallization, and may have a circular shape, in particular a circular shape with a flat zone at some edges. In addition, if the one surface is not circular, it can be treated as a circle by obtaining x and y coordinates of three or more arbitrary points from the curved edge of the one surface and forming a circle including these points.

In the bending measuring step the one surface 120 of the silicon carbide ingot 100 may be a Si surface on which a silicon atom layer is exposed.

Through the bending measuring step the degree of the bending of the one surface 120 of the silicon carbide ingot 100 is determined so that it can be a standard in the cutting of the subsequent step.

In the bending measuring step the silicon carbide ingot 100 may have a diameter of 2 inches to 12 inches, and may also have a diameter of 4 inches to 10 inches.

The silicon carbide manufacturing method may include, before or after the bending measuring step, a step of grinding a lateral surface connecting the one surface 120 and the other surface 110 of the silicon carbide ingot 100 to have a cylindrical shape to reshape it to a cylindrical shape or a step of forming a flat zone in a portion of the lateral surface after reshaping the lateral surface to a cylindrical shape.

In a silicon carbide wafer manufacturing method according to an embodiment, the cutting start step includes steps of: designating a second edge 22 having a distance of r×a along an edge of the one surface 120 from the first edge 21 of the silicon carbide ingot 100 that is measured in the bending measuring step; starting a cutting in the second edge in a direction parallel to or with a predetermined off angle with respect to the one surface through a wire saw; and reducing the cutting speed to the first cutting speed from an initial cutting speed.

The designation of the second edge 22 in the cutting start step allows to improve characteristics such as flatness of a wafer manufactured by cutting the silicon wafer 100.

The designation of the second edge 22 in the cutting start step may be performed under the consideration of the one surface of the silicon carbide ingot 100 as a circle.

In r×a of the cutting start step, r is the radius of the one surface 120 of the silicon carbide ingot 100, and a may be i) 1.4 rad to 1.75 rad or ii) 2.96 rad to 3.32 rad. In addition, a may be a non-dimensional radian conversion of a central angle of a sector formed by an arc connecting the first edge 21 and the second edge 22 and a radius in the one surface of the silicon carbide ingot. By setting a to be in such a range, it is possible to allow the flatness of the central groin of the wafer formed by the cutting of the silicon carbide ingot to have a relatively even value with little variation.

The unit of the radius of the surface 120 of the silicon carbide ingot 100 and the unit of the r×a are the same.

In the cutting start step, the silicon carbide ingot 100 may be provided with a separate holder on the one surface.

The cutting of the cutting start step may be performed in a direction parallel to the one surface 120 of the silicon carbide ingot 100 or in a direction with an off angle of 2° to 10° with respect to the one surface.

Figure 5:
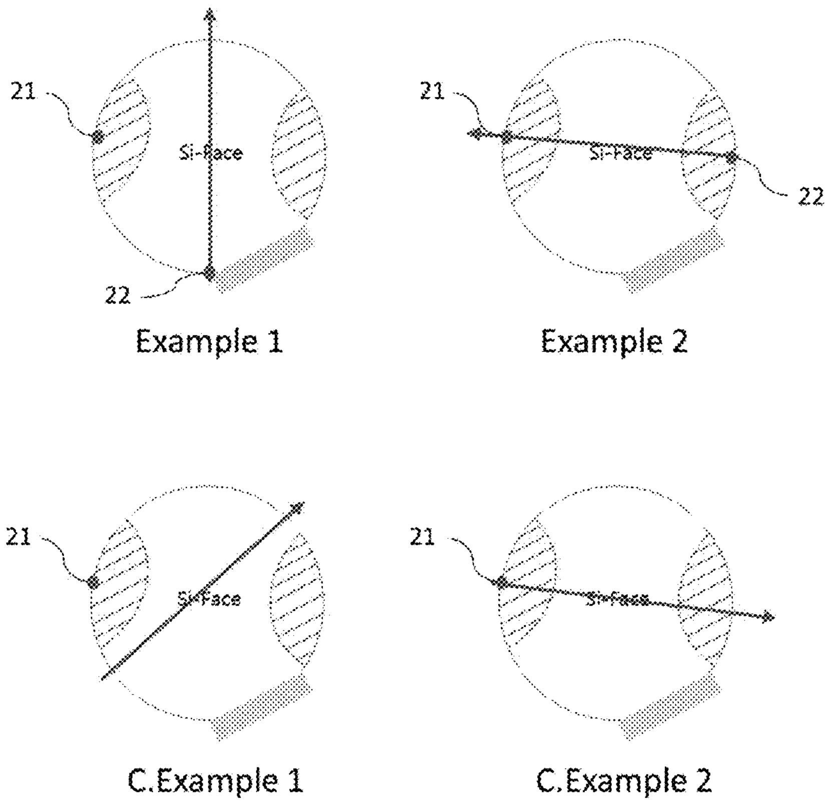
FIG. 5 is a conceptual view for showing examples of a direction in the cutting in an embodiment 1 (Example 1), an embodiment 2 (Example 2), a comparative example 1 (C.Example 1) and a comparative example 2 (C.Example 2).

The cutting of the cutting start step may be performed in a direction toward the other edge of the one surface farthest from the second edge 22 of the one surface 120 of the silicon carbide ingot 100 as shown in FIG. 5, and this direction may pass through the center of the one surface.

The cutting of the cutting start step is performed such that an arbitrary line indicating the shortest distance to the edge of the other surface 110 and the wire saw 15 approach perpendicularly one another at the second edge 22 of the one surface 120 of the silicon carbide ingot 100.

In the cutting start step, when the cutting starts while the silicon carbide ingot 100 approaches the wire saw 15, the cutting speed decreases from the initial cutting speed over time to reach the first cutting speed.

The initial cutting speed of the cutting start step may be 10 mm/hr to 15 mm/hr, or 12 mm/hr to 14 mm/hr. Thereafter, as the cutting progresses, the cutting speed may gradually reach the first cutting speed. With such a cutting speed, it is possible to stably cut the silicon carbide ingot without significant damage.

The time point at which the cutting speed reaches the first cutting speed in the cutting start step may be a time point at which the wire saw 15 cuts the silicon carbide ingot 100 by 5% to 15% of the diameter thereof, or by 10% to 15%.

The first cutting speed of the cutting start step may be 3 mm/hr to 10 mm/hr, or 4 mm/hr to 8 mm/hr. With such a cutting speed, it is possible to stably cut the silicon carbide ingot without significant damage.

The wire saw 15 of the cutting start stage may include diamond and may be formed in such a way that a diamond bead may be included on the outer circumferential surface of the wire of steel. The diamond bead may be a diamond sintered body.

The first supply amount of the wire saw 15 of the cutting start stage may be 0.5 m/min to 4 m/min, or 0.8 m/min to 3 m/min. With such a supply amount, it is possible to stably cut the silicon carbide ingot without significant damage.

The wire saw 15 in the cutting start step may be supplied while being wound on one guide roller among the plurality of guide rollers 16 and may be taken out after moving to the other guide roller.

The wire saw 15 of the cutting start stage may be multi-wire saws provided in plurality along the axial direction of the guide roller 16 with a predetermined interval, and accordingly, when the cutting is finished after a subsequent step, a plurality of wafers can be manufactured. In the multi-wire saw, the distance between each wire saw may be 100 μm to 900 μm.

Figure 3:
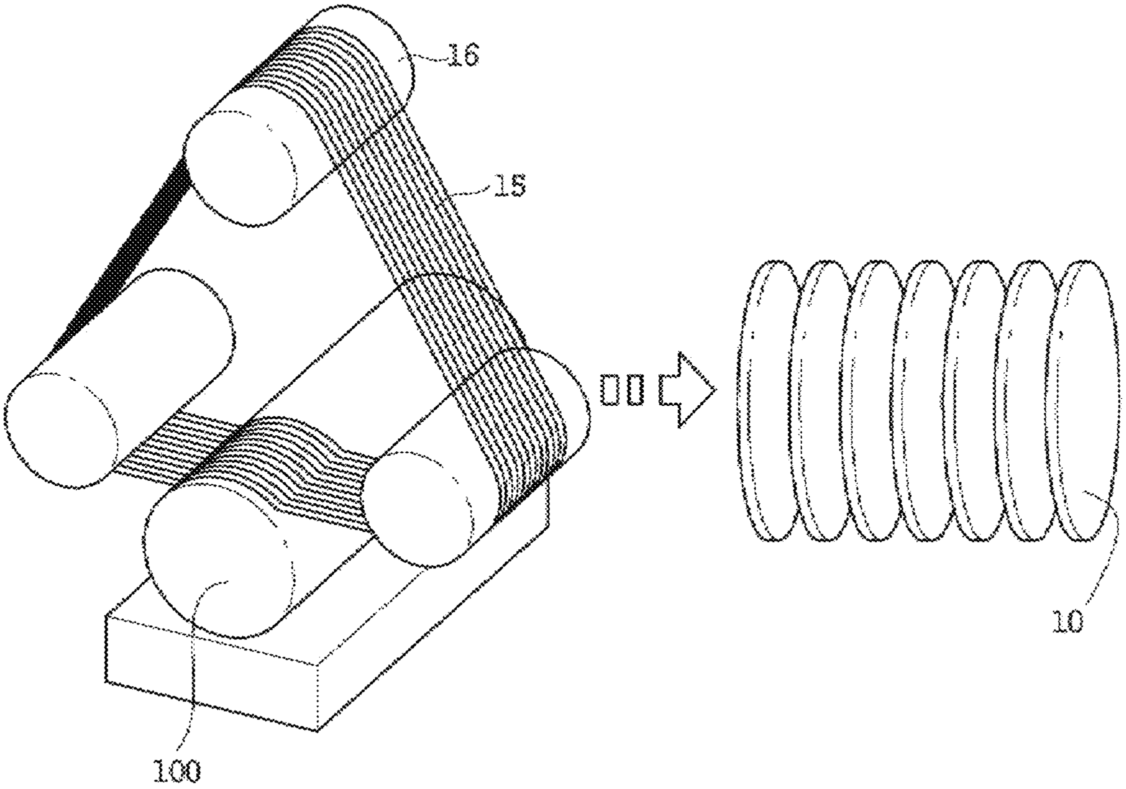
FIG. 3 is a conceptual view for showing one example of a method for manufacturing a silicon carbide wafer according to an embodiment of the present invention.

The wire saw 15 of the cutting start stage may be wound in a spiral shape along the axial direction on at least two or more guide rollers 16. Exemplarily, as shown in FIG. 3, the guide rollers may be a plurality of guide rollers including two guide rollers on the same plane and one guide roller disposed below the center of these two rollers.

In the cutting start step, the slurry may be supplied to a portion where the cutting of the silicon carbide ingot 100 starts.

In the method of manufacturing a silicon carbide wafer according to an embodiment, the cutting proceeding step is a step in which the cutting is proceeding while the first cutting speed reached in the cutting start step is substantially constant within a variation of about ±5%.

In the cutting proceeding step, the silicon carbide ingot 100 may be cut by 70% to 95%, or in particular by 70% to 85% of the diameter thereof while the cutting speed is maintained substantially at the first cutting speed.

In the cutting proceeding step, as in the cutting start step, the supply amount (m/min) of the wire saw 15 may be maintained as the first supply amount.

In the cutting proceeding step, the slurry may also be supplied to a portion where the cutting occurs as in the cutting start step.

In the method of manufacturing a silicon carbide wafer according to an embodiment, the cutting finish step is a step in which the cutting of the silicon carbide ingot 100 is completed while the first cutting speed increases.

The cutting speed of the cutting finish step may be increased from the first cutting speed to the initial cutting speed.

The cutting finish step may be performed at a time point at which 70% to 95% of the diameter of the silicon carbide ingot 100 is cut, or at a time point at which 70% to 95% of the diameter of the silicon carbide ingot is cut.

In the cutting finish step, the slurry may be supplied to a portion where cutting occurs as in the cutting starting step and the cutting proceeding step.

The characteristics of the silicon carbide wafer manufactured by completing the cutting finish step may be as described below.

As described above, the silicon carbide wafer manufacturing method starts cutting based on the bending value of the edge of the silicon carbide ingot, and appropriately controls the supply amount of the wire saw 15 and the cutting speed to provide a wafer exhibiting good flatness characteristics.

In the silicon carbide wafer manufacturing method, when 25 wafers are manufactured from one silicon carbide ingot, 18 or more non-defective silicon carbide wafers can be obtained, and the yield of the non-defective wafer may be 72% or more, or 99% or less.

The silicon carbide wafer manufacturing method may further include a forming step of flattening the thickness after the cutting finish step. The process of flattening the thickness in the forming step may be performed by applying wheel grinding to both surfaces of the wafer. Thus, it is possible to remove the damage caused by cutting and to have a uniform thickness. The wheel used for the grinding may have diamond particles embedded in its surface. The grinding wheel and the silicon carbide wafer may be rotated in opposite directions and adhered to each other, and the diameter of the grinding wheel may be greater than the diameter of the silicon carbide wafer.

The processing step may further include wet etching the wafer.

The silicon carbide wafer manufacturing method may further include a chemical mechanical polishing step after the forming step. The chemical mechanical polishing may be performed by applying an abrasive particle slurry and a silicon carbide wafer onto a rotating polishing pad, and at this time the contact may be performed with a predetermined pressure.

Silicon Carbide Wafer (10)

The silicon carbide wafer 10 according to an embodiment includes one surface 11 and the other surface 12, wherein the standard deviation of the flatness of the central region occupying 95% of the radius in an outward direction from the center of the one surface may be 10 μm or less.

The standard deviation of the flatness may be obtained by measuring the flatness values of 10 arbitrary regions in the central area of the one surface 11 of the silicon carbide wafer 10 and calculating the standard deviation thereof.

In the silicon carbide wafer 10 the standard deviation of the flatness in the central region of the one surface 11 may be 10 μm or less, 5 μm to 10 μm, or 5 μm to 7 μm.

In the silicon carbide wafer 10 an average flatness of the one surface 11 may be 250 μm or less, or 200 μm or less. In the silicon carbide wafer an average flatness of the one surface may be 30 μm or more.

In the silicon carbide wafer 10 an average flatness of the central region of the one surface 11 may be 10 μm or less, or 5 μm or more.

Since the silicon carbide wafer 10 has such flatness characteristics, a silicon carbide wafer that has undergone a subsequent polishing process may exhibit better flatness characteristics, and electrical characteristics and yield improvement in the manufactured device can be expected.

The silicon carbide wafer 10 may be a wafer immediately after being cut from a silicon carbide ingot or may be a wafer before the thickness flattening process described above.

The silicon carbide wafer 10 may have a dome shape in which the central region is convex compared to the edge, and the flatness of the central region may be higher than that of the edge region.

The silicon carbide wafer 10 may have a flatness of 45 μm to 80 μm, or 50 μm to 75 μm after undergoing the step of flattening the thickness described above.

The silicon carbide wafer 10 may have a flatness of 15 μm to 55 μm, or 20 μm to 45 μm after undergoing the chemical mechanical polishing step described above.

The flatness may be measured by the method described in Experimental Examples below.

The silicon carbide wafer 10 may include a 4H-silicon carbide structure.

As shown in FIG. 1, the silicon carbide wafer 10 may include a Si surface that is one surface 11 on which a silicon atom layer is exposed, and a C surface that is the other surface 12 on which a carbon atom layer is exposed.

In the silicon carbide ingot, the bonding force between the layer in which the carbon atoms are arranged and the layer in which the silicon atoms are arranged is weaker than the bonding force in other parts, and therefore it is easy to cut in a direction parallel to a specific plane. Therefore, when the silicon carbide ingot is cut, it is easy to cut in a direction parallel to a specific plane as a boundary between the layer of carbon atoms and the layer of silicon atoms, and the layer of carbon atoms and the layer of silicon atoms may be exposed on the cut surface. This is the same even after polishing has been carried out, and therefore in the silicon carbide wafer, the one surface may be a so-called Si surface on which a silicon atom layer is exposed, and the other surface may be a so-called C surface on which a carbon atom layer is exposed.

The thickness of the silicon carbide wafer 10 may be 100 μm to 900 μm depending on the spacing between the multi-wire saws 15 in the method for manufacturing the silicon carbide wafer, and if it is an appropriate thickness that can be applied to a semiconductor device, it is not limited thereto.

System for Manufacturing a Silicon Carbide Wafer

A system for manufacturing a silicon carbide wafer according to an embodiment includes: a bending measuring unit 1100 for measuring a first edge 21 having the greatest degree of bending on one surface of a silicon carbide ingot 100 having one surface 120, the other surface 110 and a lateral surface connecting the one surface and the other surface; a control unit 1200 designating a second edge 22 having a distance of r×a along the edge of the one surface from the first edge of the one surface of the silicon carbide ingot measured by the bending measuring unit; and a cutting unit 1300 for cutting the silicon carbide ingot in a direction parallel to or with a predetermined off angle with respect to the one surface through a wire saw at the second edge of the one surface of the silicon carbide ingot designated by the control unit, wherein the control unit controls the movement of the silicon carbide ingot toward the cutting unit and an amount of the wire saw, wherein the cutting unit performs the cutting through: a cutting start step in which a cutting speed of the cutting unit decreases to a first cutting speed; a cutting proceeding step in which the first cutting speed is substantially constant within a variation of about ±5%; and a cutting finish step in which the cutting of the silicon carbide ingot is completed while increasing the first cutting speed, wherein the supply amount of the wire saw of the cutting unit reaches a first supply amount in the cutting start step and subsequently is substantially constant within a variation of about ±5% before the cutting finish step, wherein the r is a radius of the one surface and the a may be i) 1.4 rad to 1.75 rad or ii) 2.96 rad to 3.32 rad.

Figure 4:
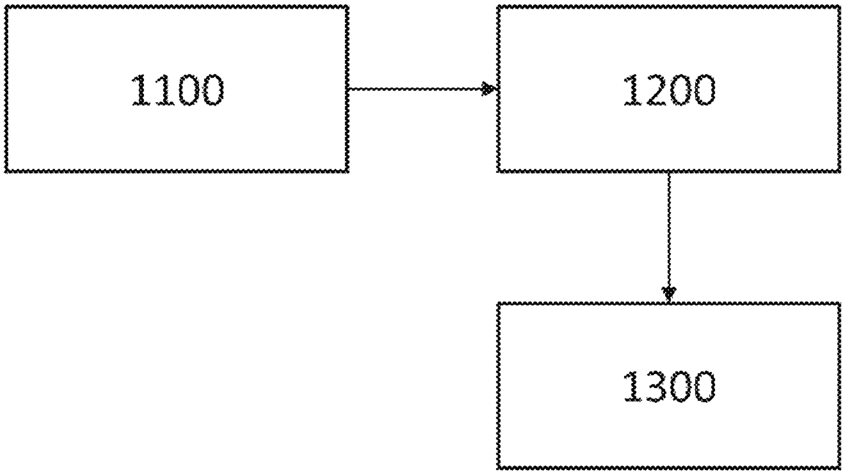
FIG. 4 is a schematic block diagram of a system for manufacturing a silicon carbide wafer according to an embodiment of the present invention.

An example of a system for manufacturing a silicon carbide wafer is schematically shown in FIG. 4.

The bending measuring unit 1100 can measure the degree of bending via the highest height of the first edge 21 with respect to the central point of the one surface 120 in the cross section of the one surface 120 of the silicon carbide ingot 100 through a Height Gauge (Mitutoyo's ID—H0560 Model), and thereby can measure the first edge 21 having the greatest degree of bending among the edge of the one surface.

The silicon carbide ingot 100 measured by the bending measuring unit 1100 may be the same as the silicon carbide ingot described above in the method for manufacturing a silicon carbide wafer.

The system for manufacturing the silicon carbide wafer may include means for moving the silicon carbide ingot 100 toward the cutting unit.

The system for manufacturing the silicon carbide wafer may include a separate holder on one side of the silicon carbide ingot 100.

The control unit 1200 can designate the second edge 22 having a distance of r×a along the edge of the one surface from the first edge 21 of the one surface 120 of the silicon carbide ingot 100 measured by the bending measuring unit 1200. The one surface of the silicon carbide ingot may be a surface cut from the seed crystal after being manufactured through the sublimation and recrystallization and may have a circular shape or a circular shape with a flat zone formed on some edges thereof. In addition, when the one surface is not circular, the control unit may treat it as a circle by obtaining the x, y coordinates of three or more arbitrary points in the curved edge of the one surface and forming a circle including these points.

r is the radius of the one surface 120 of the silicon carbide ingot 100, and a may be i) 1.4 rad to 1.75 rad or ii) 2.96 rad to 3.32 rad. In addition, a may be a non-dimensional radian conversion of a central angle of a sector formed by an arc connecting the first edge 21 and the second edge 22 and a radius in the one surface of the silicon carbide ingot. By setting a to have such a range, it is possible to have a relatively even value with little variation in flatness near the center of the wafer to be manufactured when the silicon carbide ingot is cut.

The control unit 1200 designates the second edge 22 of the one surface 120 of the silicon carbide ingot 100 to determine the optimal cutting start point and thereby allows the cutting unit 1300 to effectively cut.

The cutting unit 1300 cuts through the wire saw 15 at the second edge 22 of the one surface 120 of the silicon carbide ingot 100 designated by the control unit 1200 in a direction parallel to the one surface or in a direction with a predetermined off angle with respect to the one surface. The predetermined off angle may be 2° to 10°.

The wire saw 15 of the cutting part 1300 may be wound around at least two guide rollers 16 in a spiral shape along the axial direction. Exemplarily, as shown in FIG. 3, the guide roller may be a plurality of guide rollers including two guide rollers on the same plane and one guide roller disposed below the center of the two guide rollers.

The wire saw 15 of the cutting unit 1300 may include diamond and may be formed in such a way that a diamond bead may be included on the outer circumferential surface of the wire of steel. The diamond bead may be a diamond sintered body.

The cutting part 1300 may be cut in a direction toward the farthest edge of the one surface when the cutting starts from the second edge 22 of the one surface 120 of the silicon carbide ingot 100.

The cutting part 1300 may cut such that an arbitrary line toward the edge of the other surface 110 and the wire saw 15 approach perpendicularly one another when the cutting starts at the second edge 22 of the one surface 120 of the silicon carbide ingot 100.

The cutting unit 1300 performs cutting such that when the cutting starts while the silicon carbide ingot 100 approaches the wire saw 15, the cutting speed may be decreased from the initial cutting speed over time to reach the first cutting speed and then may be increased again to the initial cutting speed when the silicon carbide ingot is cut above a certain level.

The initial cutting speed of the cutting unit 1300 may be 10 mm/hr to 15 mm/hr, and 12 mm/hr to 14 mm/hr. Thereafter, as the cutting progresses, the cutting speed may gradually reach the first cutting speed. With such a cutting speed, it is possible to stably cut the silicon carbide ingot without significant damage.

The time point at which the cutting unit 1300 reaches the first cutting speed may be a time point at which the wire saw 15 cuts the silicon carbide ingot 100 by 5% to 15% of the diameter thereof, and by 10% to 15% of the diameter. Then, the time point at which the cutting speed starts to be increased may be a time point at which the wire saw 15 cuts the silicon carbide ingot 100 by 70% to 95% of the diameter thereof, and by 70% to 85% of the diameter.

The first cutting speed of the cutting unit 1300 may be 3 mm/hr to 10 mm/hr, and 4 mm/hr to 8 mm/hr. With such a cutting speed, it is possible to stably cut the silicon carbide ingot without significant damage.

The first supply amount of the wire saw 15 of the cutting unit 1300 may be 0.5 m/min to 4 m/min, and 0.8 m/min to 3 m/min. With such a supply amount, it is possible to stably cut the silicon carbide ingot without significant damage.

The wire saw 15 of the cutting unit 1300 is wound to one guide roller among the plurality of guide rollers 16 and is then supplied, and then moved to the other guide roller to be wound and then is taken out.

The wire saw 15 of the cutting unit 1300 may be multi-wire saws provided in plurality along the axial direction of the guide roller 16 with a predetermined interval, and when the cutting is finished through the cutting unit, a plurality of wafers can be manufactured. In the multi-wire saws, the spacing distance between each wire saw may be 100 μm to 900 μm.

The system for manufacturing silicon carbide wafer may further include a slurry supply unit for supplying a slurry when the cutting unit 1300 cuts.

In the silicon carbide wafer manufacturing system, when 25 wafers are manufactured from one silicon carbide ingot, 18 or more non-defective silicon carbide wafers can be obtained, and the non-defective yield may be 72% or more.

Hereinafter, the present invention will be described in more detail using specific examples. The following examples are examples to help the understanding of the present invention, and the scope of the present invention is not limited thereto.

Example 1—Manufacturing of Silicon Carbide Wafer

A 4H silicon carbide ingot 100 prepared through a sublimation-recrystallization method in a reactor in which the raw material and the silicon carbide seed crystal are spaced apart from each other is prepared, and the bending value of the one surface 120 of the silicon carbide ingot 120 that is a surface cut from the seed crystal was measured through Height Gauge (Mitutoyo's ID-H0560 Model).

Based on the bending value of the one surface, a place having the highest bending value among the edges of the one surface is designated as the first edge 21, and the second edge 22 having a distance of r×a along the edge of the one surface of the silicon carbide ingot from the first edge was designated. In this case, r is the radius of the one surface, and a is 1.57 rad.

In the designated second edge 22 of the one surface, a multi-wire saw including a diamond bead was arranged in a direction perpendicular to an arbitrary line indicating the shortest distance toward one edge of the other surface. The wire saw was prepared by being wound around a plurality of guide rollers. The supply amount of the wire saw was 1.5 m/min to 3 m/min, and the initial cutting speed was 12 mm/hr to 14 mm/hr, and the cutting was started while adding the slurry. At this time, as shown in FIG. 5, the cutting direction was set to start from the second edge to a far edge of the one surface while passing through the center of the one surface, and the off angle was 4°. When the silicon carbide ingot was cut by 10% to 15% of the diameter of the ingot, the cutting speed reaches the first cutting speed of 4 mm/hr to 6 mm/hr. Thereafter, when the silicon carbide ingot was cut by 80% to 90% of the diameter of the silicon carbide ingot, the cutting speed was increased to complete the cutting, and thereby silicon carbide wafers were manufactured. At this time, numbers such as #1 were sequentially assigned to each wafer aligned in a direction from one surface to the other.

Example 2—Manufacturing of Silicon Carbide Wafer

A silicon carbide wafer was manufactured under the same condition as in Example 1, except that a was changed to 3.14 rad in the condition of Example 1.

Comparative Example 1—Manufacturing of Silicon Carbide Wafer

In Example 1 a was changed to 0.7 rad, and the supply amount of the wire saw was increased until the silicon carbide ingot is cut by half of the initial diameter thereof and had a maximum value of 3 m/min and is decreased thereafter. The cutting speed was the same in all phases from 4 mm/hr to 6 mm/hr, and other conditions were the same as in Example 1. The silicon carbide wafer was manufactured under these conditions.

Comparative Example 2—Manufacturing of Silicon Carbide Wafer

A silicon carbide wafer was manufactured under the same condition as in Comparative Example 1, except that a was changed to 0 rad in the condition of Comparative Example 1.

Figure 6:
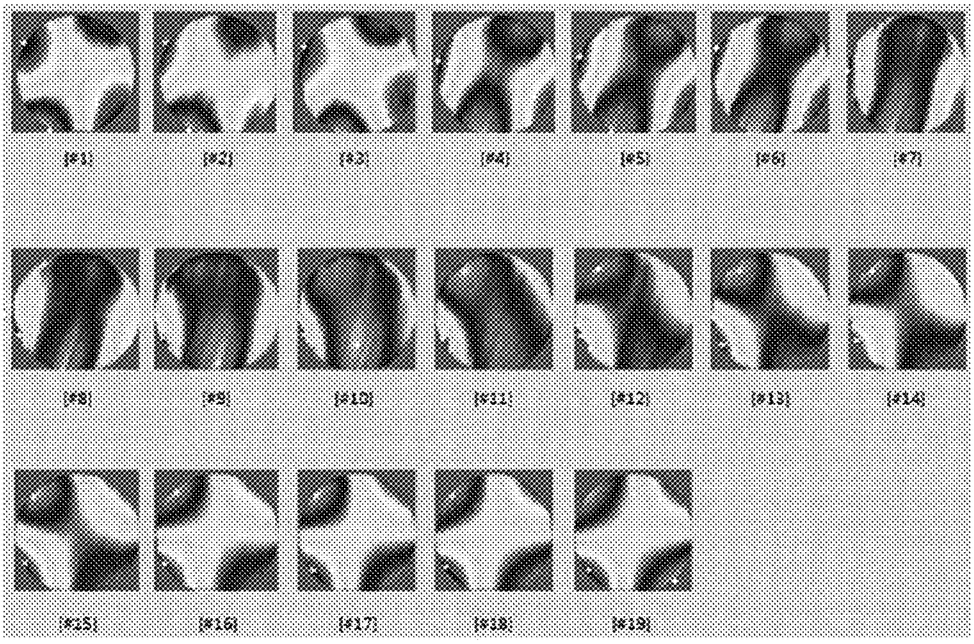
FIG. 6 shows photographs visually showing the flatness of wafers manufactured in comparative example 1 (C.Example 1).
Figure 7:
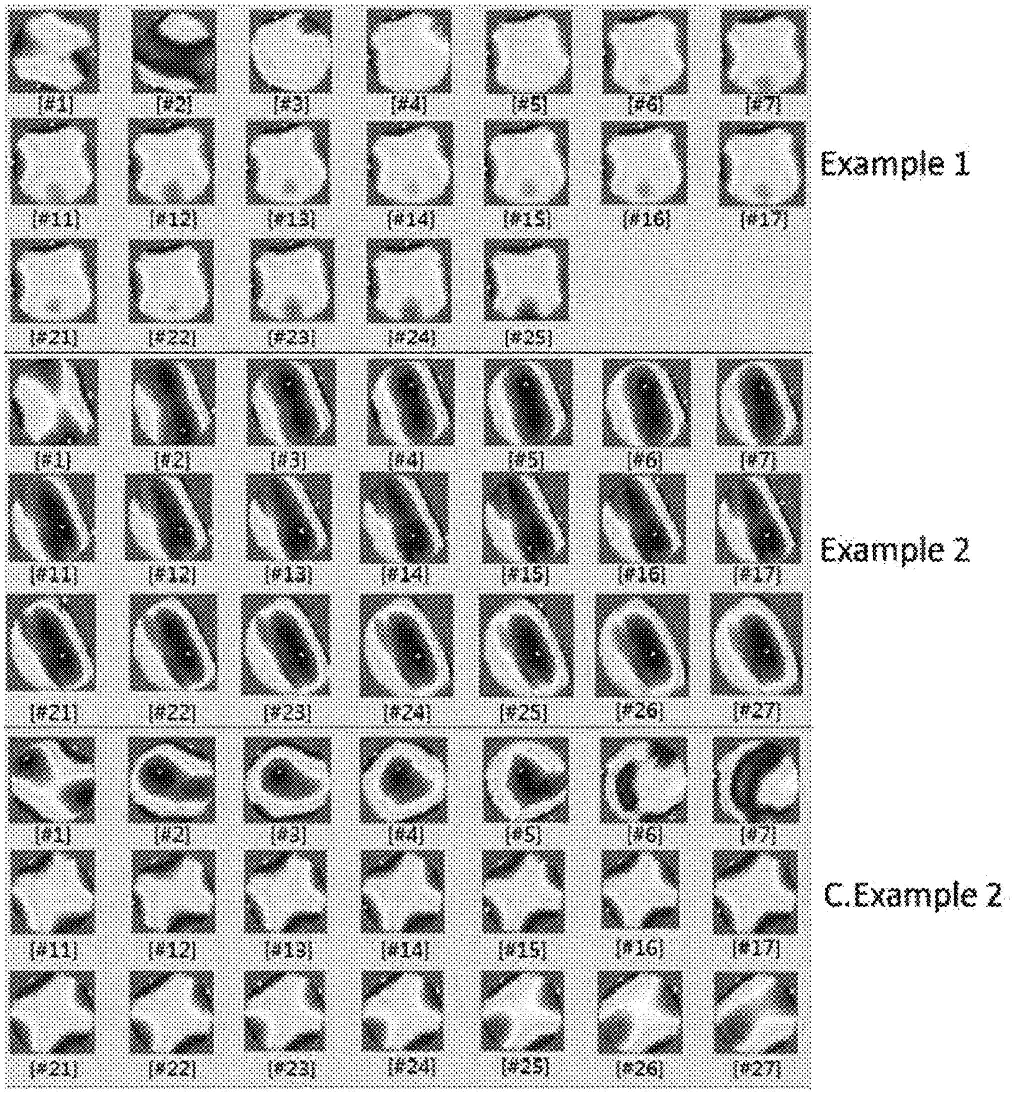
FIG. 7 shows photographs visually showing the flatness of wafers manufactured in an embodiment 1 (Example 1), an embodiment 2 (Example 2) and a comparative example 2 (C.Example 2).

Experiment Example—Comparison of Flatness of Wafer with Regard to Cutting Position of Silicon Carbide Ingot The flatness and the flatness of the center region occupying 95% of radius from the center of the wafers manufactured by Examples and the Comparative Examples were measured by Corning Tropel Flatmaster 200 Model, and these are shown in FIG. 6, FIG. 7 and Table 1.

TABLE 1

| Item | Example 1 | Example 2 | Comparative Example 1 | Comparative Example 2 |
|---|---|---|---|---|
| Distance between first edge and second edge along periphery of one surface | r × 1.57 | r × 3.14 | r × 0.7 | r × 0 |
| Cutting speed (mm/hr) | start: 12~14 proceeding: 4~6 finish: 12~14 | start: 12~14 proceeding: 4~6 finish: 12~14 | Same for all phases 4~6 | Same for all phases 4~6 |
| Supply amount of wire (m/min) | Same for all phases 1.5~3 | Same for all phases1.5~3 | start: 0.8 proceeding: 3 finish: 0.8 | start: 0.8 proceding: 3 finish: 0.8 |
| Damage | X | X | #1 wafer | X |
| Number of non-defective wafer | #4~#25 non-defective | #2~#29 non-defective | #6~#14 non-defective | #11~#25 non-defective |
| Yield of non-defective wafer | 88% | 96.5% | 45% | 55.5% |
| Standard deviation of flatness of center region of non-defective wafer | 5~10 μm | 5~7 μm | 15~25 μm | 15~20 μm |

r: radius of silicon carbide ingot

Referring to FIG. 7, in the case of Example 1, it can be seen that wafers of #3 or higher numbers exhibit a relatively even flatness pattern and the standard deviation of flatness in the central area is 5 μm to 10 μm. In the case of Example 2, it can be seen that wafers of #2 or higher numbers exhibit a relatively even flatness pattern, and the standard deviation of flatness in the central region is 5 μm to 7 μm.

Referring to FIGS. 6 and 7, in Comparative Examples 1 and 2, it can be seen that in Comparative Example 1, some wafers were damaged during the cutting, and in Comparative Examples 1 and 2, the number of non-defective wafers was significantly reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A silicon carbide wafer manufacturing method comprising:

a bending measuring step of measuring a first edge having the greatest degree of a bending at one surface of a silicon carbide ingot having one surface, the other surface and a lateral surface connecting the one surface and the other surface;

a cutting start step of starting a cutting at a second edge 22 having a distance of r×a along an edge of the one surface from the first edge 21 in a direction parallel to or with a predetermined off angle with respect to the one surface through the wire saw 15, a cutting speed being decreased to a first cutting speed in the cutting start step;

a cutting proceeding step in which the first cutting speed is substantially constant within a variation of about ±5%; and a finish step in which the first cutting speed is increased and the cutting of the silicon carbide ingot is completed, wherein a supply amount (m/min) of the wire saw reaches a first supply amount in the cutting start step and subsequently is substantially constant within a variation of about ±5% before the finish step, wherein r is a radius of the one surface, and wherein a may be i) 1.4 rad to 1.75 rad or ii) 2.96 rad to 3.32 rad.

2. The silicon carbide wafer manufacturing method of claim 1, wherein the silicon carbide ingot comprises 4H silicon carbide grown by a sublimation and a recrystallization.

3. The silicon carbide wafer manufacturing method of claim 1, wherein the cutting in the cutting start step proceeds in a direction toward an edge farthest from the second edge of the one surface.

4. The silicon carbide wafer manufacturing method of claim 1, wherein the first cutting speed is 3 mm/hr to 10 mm/hr.

5. The silicon carbide wafer manufacturing method of claim 1, wherein the first supply amount is 0.5 m/min to 4 m/min.

6. The silicon carbide wafer manufacturing method of claim 1, wherein the wire saw comprises multi-wire saws that are provided in a plurality along a direction from the one surface and to the other surface of the silicon carbide ingot with a predetermined interval.

7. A system for manufacturing a silicon carbide wafer comprising:

a bending measuring unit measuring a first edge having a greatest degree of being in on surface of a silicon carbide ingot comprising the one surface, the other surface and a lateral surface connecting the one surface and the other surface;

a control unit designating a second edge having a distance of r×a along an edge of the one surface of the first edge of the one surface of the silicon carbide ingot measured by the bending measuring unit; and a cutting unit cutting the silicon carbide ingot in a direction parallel to or with a predetermined off angle with respect to the one surface through a wire saw, wherein the control unit controls a movement of the silicon carbide ingot toward the cutting unit and a supply amount of the wire saw, wherein the cutting unit fabricates the silicon carbide wafer by performing: a cutting start step in which a cutting speed of the cutting unit is decreased to a first cutting speed; a cutting proceeding step in which the first cutting speed is substantially constant within a variation of about ±5%; and the cutting finish step in which the first cutting speed is increased and a cutting of the silicon carbide ingot is completed, wherein a supply amount (m/min) of the wire saw of the cutting unit approaches a first supply amount in the cutting start step and is substantially constant within a variation about ±5%, wherein r is a radius of the one surface, and wherein a is i) 1.4 rad to 1.75 rad or ii) 2.96 rad to 3.32 rad.

* * * * *